(12) United States Patent
Lee et al.

(10) Patent No.: US 6,785,099 B2
(45) Date of Patent: Aug. 31, 2004

(54) READ GAP IMPROVEMENTS THROUGH HIGH RESISTANCE MAGNETIC SHIELD LAYERS

(75) Inventors: Wen-Yaung Lee, San Jose, CA (US); Tsann Lin, Saratoga, CA (US); Daniele Mauri, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 196 days.

(21) Appl. No.: 10/068,231

(22) Filed: Feb. 4, 2002

(65) Prior Publication Data

US 2003/0147184 A1 Aug. 7, 2003

(51) Int. Cl.[7] ............................................... G11B 5/39
(52) U.S. Cl. ...................................... 360/319; 360/320
(58) Field of Search ................................. 360/319, 320

(56) References Cited

U.S. PATENT DOCUMENTS

| | | | |
|---|---|---|---|
| 5,206,590 A | | 4/1993 | Dieny et al. |
| 6,385,015 B2 | * | 5/2002 | Narumi et al. ............... 360/319 |
| 6,452,761 B1 | * | 9/2002 | Carey et al. ................ 360/320 |
| 6,643,105 B2 | * | 11/2003 | Nakamoto et al. .......... 360/319 |
| 2001/0038517 A1 | * | 11/2001 | Kamijima .................... 360/320 |
| 2002/0075609 A1 | * | 6/2002 | Terunuma .................... 360/319 |

FOREIGN PATENT DOCUMENTS

JP        2001-56914    * 2/2003

* cited by examiner

*Primary Examiner*—David Ometz
(74) *Attorney, Agent, or Firm*—Lewis L. Nunnelley; William D. Gill (57) ABSTRACT

A read head is provided having having ultrathin read gap layers with improved insulative properties between a magnetoresistive sensor and ferromagnetic shield layers. The read head comprises a magnetoresistive sensor with first and second shield cap layers made of high resistivity permeable magnetic material formed between the first and second ferromagnetic shields and the first and second insulative read gap layers, respectively. The shield cap layers made of Fe—Hf—$O_x$ material, or alternatively, the Mn—Zn ferrite material provide highly resistive or insulating soft ferromagnetic layers which add to the electrically insulative read gap layers to provide increased electrical insulation of the spin valve sensor from the metallic ferromagnetic shields while not adding to the magnetic read gap of the read head. The extra insulation provided by the highly resistive shield cap layers makes it possible to use ultrathin insulative first and second read gap layers without increased risk of electrical shorting between the spin valve sensor and the ferromagnetic first and second shields.

3 Claims, 6 Drawing Sheets

READ GAP IMPROVEMENTS THROUGH HIGH RESISTANCE MAGNETIC SHIELD LAYERS

BACKGROUND OF THE INVENTION

1. Field of the Invention

This invention relates in general to spin valve magnetoresistive sensors for reading information signals from a magnetic medium and, in particular, to a spin valve sensor with high resistance magnetic layers adjacent to the magnetic shields to improve insulation of the magnetoresistive sensor from the conductive shields.

2. Description of the Related Art

Computers often include auxiliary memory storage devices having media on which data can be written and from which data can be read for later use. A direct access storage device (disk drive) incorporating rotating magnetic disks is commonly used for storing data in magnetic form on the disk surfaces. Data is recorded on concentric, radially spaced tracks on the disk surfaces. Magnetic heads including read sensors are then used to read data from the tracks on the disk surfaces.

In high capacity disk drives, magnetoresistive (MR) read sensors, commonly referred to as MR sensors, are the prevailing read sensors because of their capability to read data from a surface of a disk at greater track and linear densities than thin film inductive heads. An MR sensor detects a magnetic field through the change in the resistance of its MR sensing layer (also referred to as an "MR element") as a function of the strength and direction of the magnetic flux being sensed by the MR layer.

The conventional MR sensor operates on the basis of the anisotropic magnetoresistive (AMR) effect in which an MR element resistance varies as the square of the cosine of the angle between the magnetization in the MR element and the direction of sense current flowing through the MR element. Recorded data can be read from a magnetic medium because the external magnetic field from the recorded magnetic medium (the signal field) causes a change in the direction of magnetization in the MR element, which in turn causes a change in resistance in the MR element and a corresponding change in the sensed current or voltage.

Another type of MR sensor is the giant magnetoresistance (GMR) sensor manifesting the GMR effect. In GMR sensors, the resistance of the MR sensing layer varies as a function of the spin-dependent transmission of the conduction electrons between magnetic layers separated by a non-magnetic layer (spacer) and the accompanying spin-dependent scattering which takes place at the interface of the magnetic and non-magnetic layers and within the magnetic layers.

GMR sensors using only two layers of ferromagnetic material (e.g., Ni—Fe) separated by a layer of non-magnetic material (e.g., copper) are generally referred to as spin valve (SV) sensors manifesting the SV effect.

Figure 1:
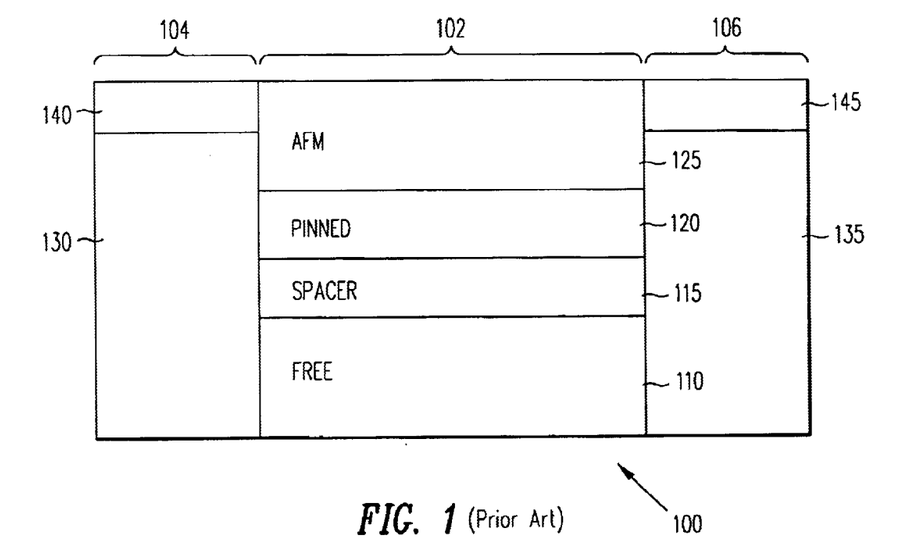
FIG. 1 is an air bearing surface view, not to scale, of a prior art SV sensor.

FIG. 1 shows a prior art SV sensor 100 comprising end regions 104 and 106 separated by a central region 102. A first ferromagnetic layer, referred to as a pinned layer 120, has its magnetization typically fixed (pinned) by exchange coupling with an antiferromagnetic (AFM) layer 125. The magnetization of a second ferromagnetic layer, referred to as a free layer 110, is not fixed and is free to rotate in response to the magnetic field from the recorded magnetic medium (the signal field). The free layer 110 is separated from the pinned layer 120 by a non-magnetic, electrically conducting spacer layer 115. Hard bias layers 130 and 135 formed in the end regions 104 and 106, respectively, provide longitudinal bias for the free layer 110. Leads 140 and 145 formed on hard bias layers 130 and 135, respectively, provide electrical connections for sensing the resistance of SV sensor 100. IBM's U.S. Pat. No. 5,206,590 granted to Dieny et al., incorporated herein by reference, discloses a GMR sensor operating on the basis of the SV effect.

Figure 2:
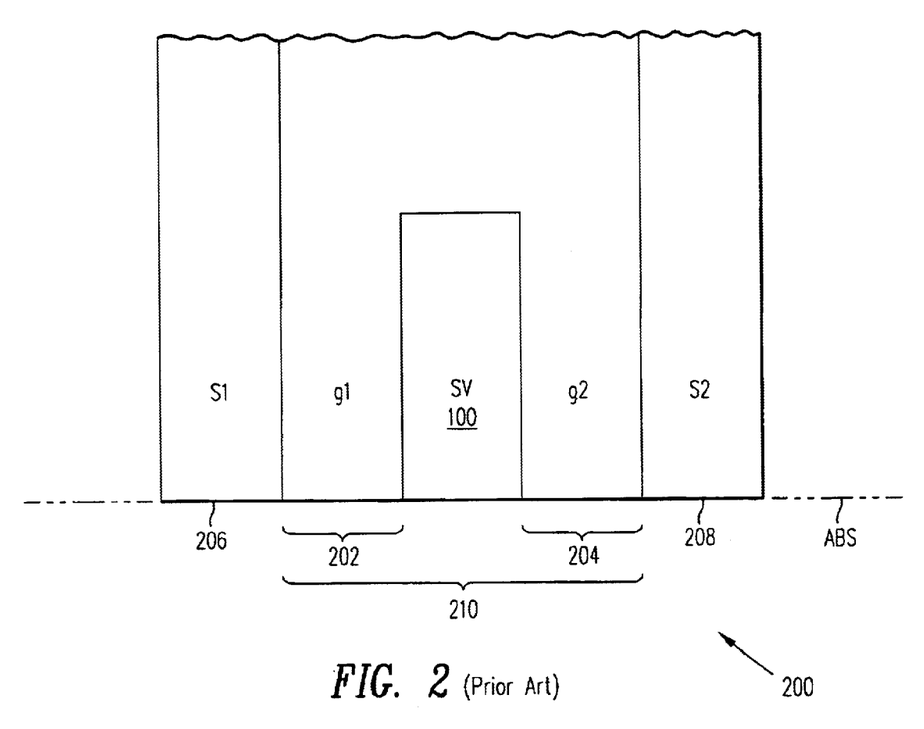
FIG. 2 is a vertical cross-section view, not to scale, of a read head portion of a read/write magnetic head using a prior art spin valve sensor.

FIG. 2 shows a prior art read back head 200 incorporating an SV sensor. Referring to FIG. 2, the spin valve sensor 100 is sandwiched between nonmagnetic insulative first and second read gap layers 202 and 204, and the read gap layers are sandwiched between ferromagnetic first and second shield layers 206 and 208. The separation between the first and second shield layers 206 and 208 defines the read gap 210. The ferromagnetic first and second shield layers 206 and 208 are needed to shield the sensor 100 from stray magnetic fields. The nonmagnetic insulative first and second read gap layers 202 and 204 provide electrical insulation of the sensor 100 from the metallic ferromagnetic shield layers 206 and 208.

A problem with the prior art sensors arises as the size of the read head is decreased in order to address the need for higher storage density disk files. As the read gap is made ultrathin, the insulative properties of the first and second read gap layers is reduced leading to possible shorting of the magnetoresistive sensor to the metallic shields. Therefore there is a need for improved insulation of the read sensor from the shields for read heads having ultrathin magnetic read gaps in order to read magnetic data at higher storage densities.

SUMMARY OF THE INVENTION

Accordingly, it is an object of the present invention to disclose a magnetic read head having ultrathin read gap layers with improved insulative properties between a magnetoresistive sensor and ferromagnetic shield layers.

It is another object of the present invention to disclose a magnetic read head having improved electrical insulation of the magnetoresistive sensor from the shields without increasing the magnetic read gap.

It is a further object of the present invention to disclose a magnetic read head having reduced smearing and telegraph noise by keeping metallic parts of the shields at an increased distance from the magnetoresistive sensor.

In accordance with the principles of the present invention, there is disclosed a preferred embodiment of the present invention wherein first and second shield cap layers made of high resistivity permeable magnetic material are formed between the first and second ferromagnetic shields and the first and second insulative read gap layers, respectively, of a magnetoresistive read head. In the preferred embodiment, the read head comprises a first shield cap layer of iron hafnium oxide (Fe—Hf—$O_x$), or alternatively, manganese zirconium ferrite (Mn—Zn ferrite) disposed between the first ferromagnetic shield and the first insulative read gap layer, a spin valve sensor sandwiched between the read gap layer and a second insulative read gap layer, and a second shield cap layer of Fe—Hf—$O_x$, or alternatively, Mn—Zn ferrite disposed between the second read gap layer and a second ferromagnetic shield.

The Fe—Hf—$O_x$ material, or alternatively, the Mn—Zn ferrite material provide highly resistive or insulating soft ferromagnetic layers which add to the electrically insulative read gap layers to provide increased electrical insulation of the spin valve sensor from the metallic ferromagnetic shields while not adding to the magnetic read gap of the read head. The extra insulation provided by the highly resistive shield cap layers makes it possible to use ultrathin insulative first and second gap layers without increased risk of electrical shorting between the spin valve sensor and the ferromagnetic first and second shields.

The above, as well as additional objects, features and advantages of the present invention will become apparent in the following detailed written description.

BRIEF DESCRIPTION OF THE DRAWINGS

For a fuller understanding of the nature and advantages of the present invention, as well as of the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENT

The following description is the best embodiment presently contemplated for carrying out the present invention. This description is made for the purpose of illustrating the general principles of the present invention and is not meant to limit the inventive concepts claimed herein.

Figure 3:
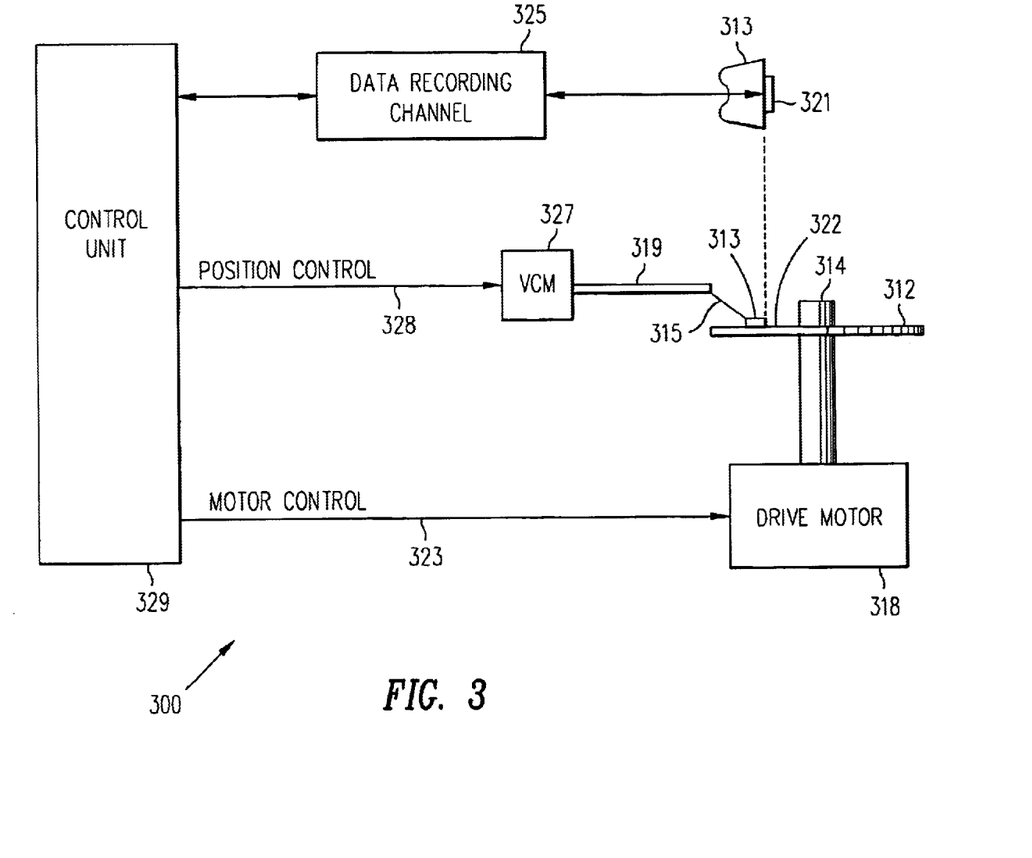
FIG. 3 is a simplified drawing of a magnetic recording disk drive system using the improved read head of the present invention.

Referring now to FIG. 3, there is shown a disk drive 300 embodying the present invention. As shown in FIG. 3, at least one rotatable magnetic disk 312 is supported on a spindle 314 and rotated by a disk drive motor 318. The magnetic recording media on each disk is in the form of an annular pattern of concentric data tracks (not shown) on the disk 312.

At least one slider 313 is positioned on the disk 312, each slider 313 supporting one or more magnetic read/write heads 321 where the head 321 incorporates the SV sensor of the present invention. As the disks rotate, the slider 313 is moved radially in and out over the disk surface 322 so that the heads 321 may access different portions of the disk where desired data is recorded. Each slider 313 is attached to an actuator arm 319 by means of a suspension 315. The suspension 315 provides a slight spring force which biases the slider 313 against the disk surface 322. Each actuator arm 319 is attached to an actuator 327. The actuator as shown in FIG. 3 may be a voice coil motor (VCM). The VCM comprises a coil movable within a fixed magnetic field, the direction and speed of the coil movements being controlled by the motor current signals supplied by a controller 329.

During operation of the disk storage system, the rotation of the disk 312 generates an air bearing between the slider 313 (the surface of the slider 313 which includes the head 321 and faces the surface of the disk 312 is referred to as an air bearing surface (ABS)) and the disk surface 322 which exerts an upward force or lift on the slider. The air bearing thus counter-balances the slight spring force of the suspension 315 and supports the slider 313 off and slightly above the disk surface by a small, substantially constant spacing during normal operation.

The various components of the disk storage system are controlled in operation by control signals generated by the control unit 329, such as access control signals and internal clock signals. Typically, the control unit 329 comprises logic control circuits, storage chips and a microprocessor. The control unit 329 generates control signals to control various system operations such as drive motor control signals on line 323 and head position and seek control signals on line 328. The control signals on line 328 provide the desired current profiles to optimally move and position the slider 313 to the desired data track on the disk 312. Read and write signals are communicated to and from the read/write heads 321 by means of the recording channel 325. Recording channel 325 may be a partial response maximum likelihood (PMRL) channel or a peak detect channel. The design and implementation of both channels are well known in the art and to persons skilled in the art. In the preferred embodiment, recording channel 325 is a PMRL channel.

The above description of a typical magnetic disk storage system, and the accompanying illustration of FIG. 3 are for representation purposes only. It should be apparent that disk storage systems may contain a large number of disks and actuator arms, and each actuator arm may support a number of sliders.

Figure 4:
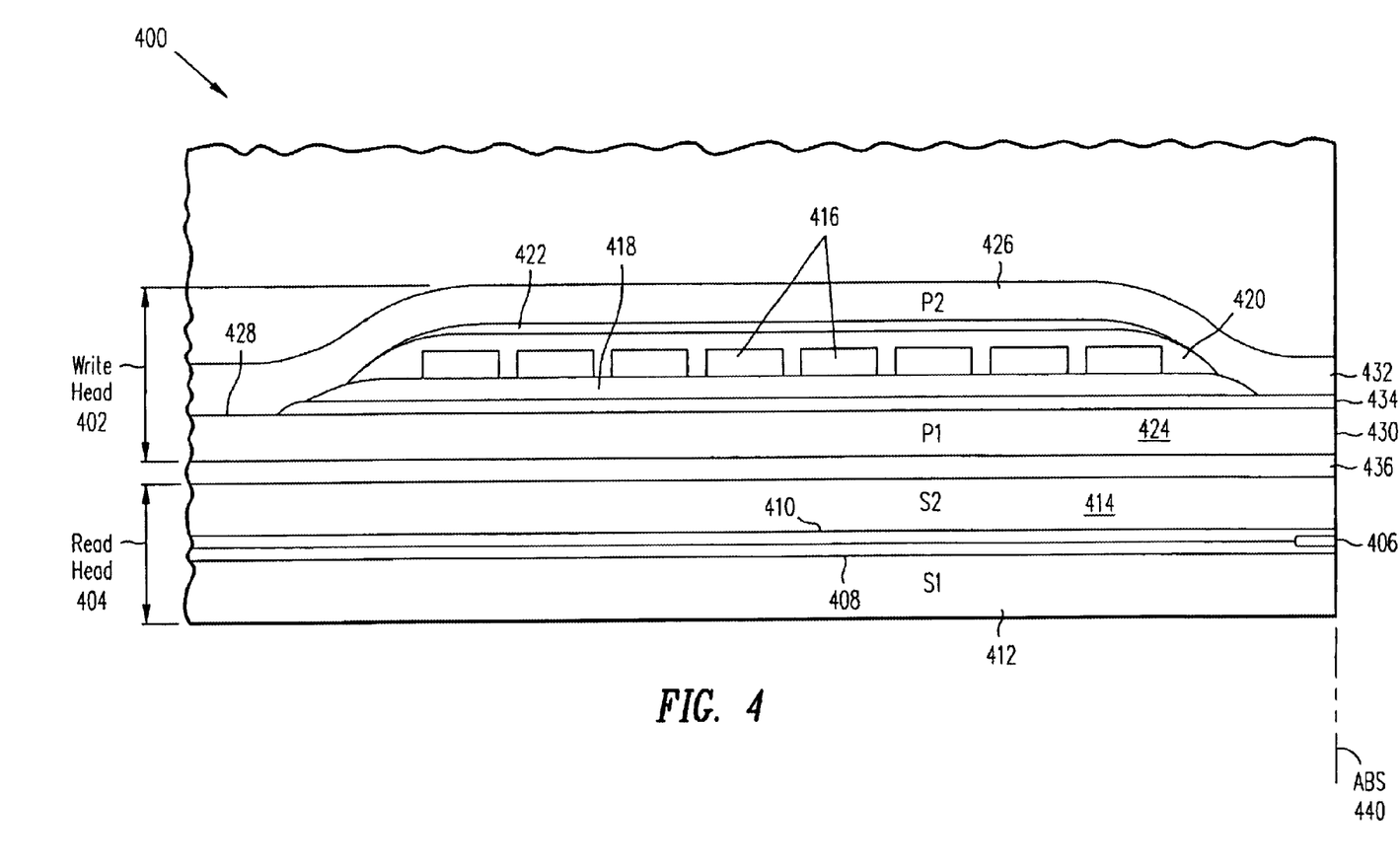
FIG. 4 is a vertical cross-section view, not to scale, of a "piggyback" read/write magnetic head.

FIG. 4 is a side cross-sectional elevation view of a "piggyback" magnetic read/write head 400, which includes a write head portion 402 and a read head portion 404, the read head portion employing a SV sensor 406 according to the present invention. The SV sensor 406 is sandwiched between nonmagnetic insulative first and second read gap layers 408 and 410, and the read gap layers are sandwiched between ferromagnetic first and second shield layers 412 and 414. In response to external magnetic fields, the resistance of the SV sensor 406 changes. A sense current $I_S$ conducted through the sensor causes these resistance changes to be manifested as potential changes. These potential changes are then processed as readback signals by the processing circuitry of the data recording channel 346 shown in FIG. 3.

The write head portion 402 of the magnetic read/write head 400 includes a coil layer 416 sandwiched between first and second insulation layers 418 and 420. A third insulation layer 422 may be employed for planarizing the head to eliminate ripples in the second insulation layer 420 caused by the coil layer 416. The first, second and third insulation layers are referred to in the art as an insulation stack. The coil layer 416 and the first, second and third insulation layers 418, 420 and 422 are sandwiched between first and second pole piece layers 424 and 426. The first and second pole piece layers 424 and 426 are magnetically coupled at a back gap 428 and have first and second pole tips 430 and 432 which are separated by a write gap layer 434 at the ABS 440. An insulation layer 436 is located between the second shield layer 414 and the first pole piece layer 424. Since the second shield layer 414 and the first pole piece layer 424 are separate layers this read/write head is known as a "piggyback" head.

Figure 5:
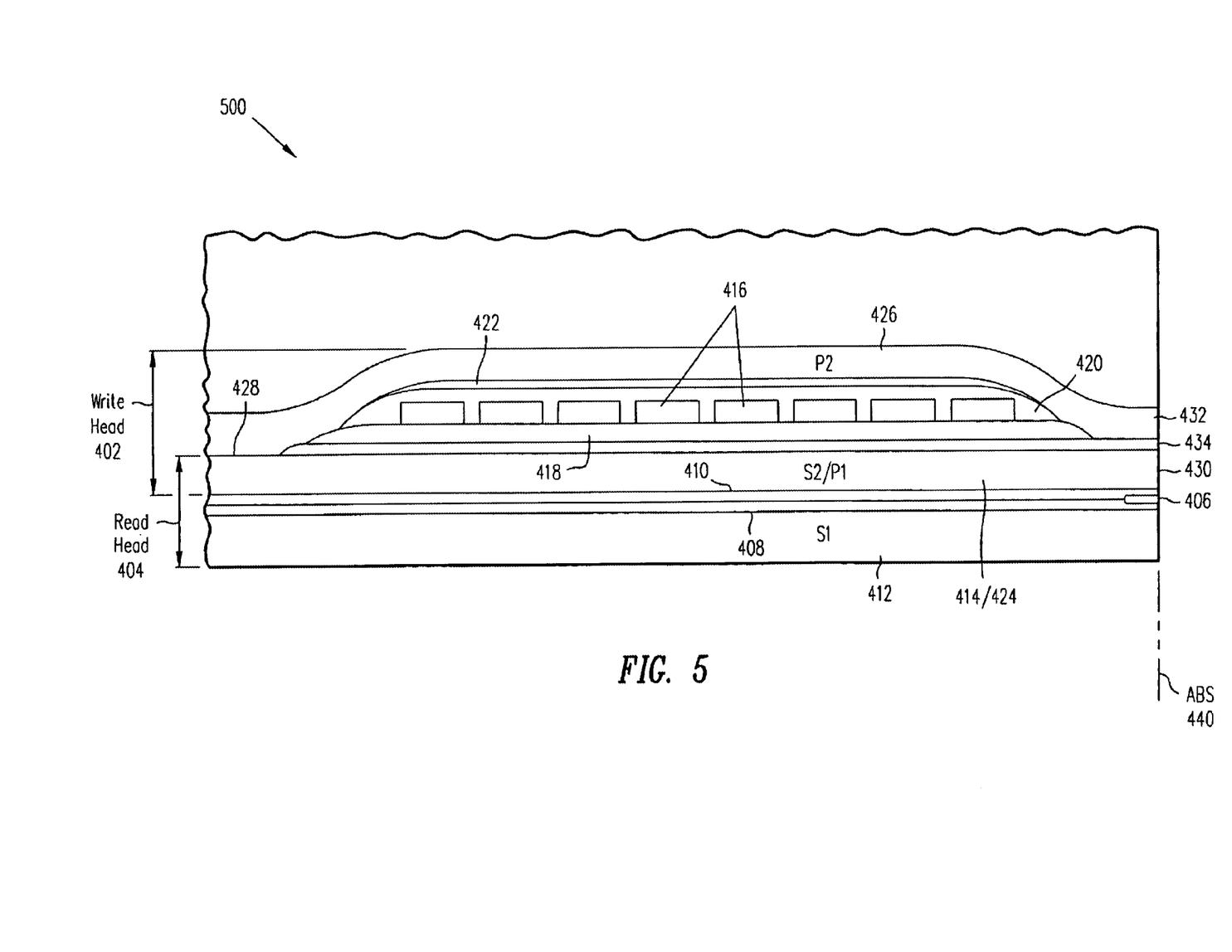
FIG. 5 is a vertical cross-section view, not to scale, of a "merged" read/write magnetic head.

FIG. 5 is the same as FIG. 4 except the second shield layer 514 and the first pole piece layer 524 are a common layer. This type of read/write head is known as a "merged" head 500. The insulation layer 436 of the piggyback head in FIG. 4 is omitted in the merged head 500 of FIG. 5.

Figure 6:
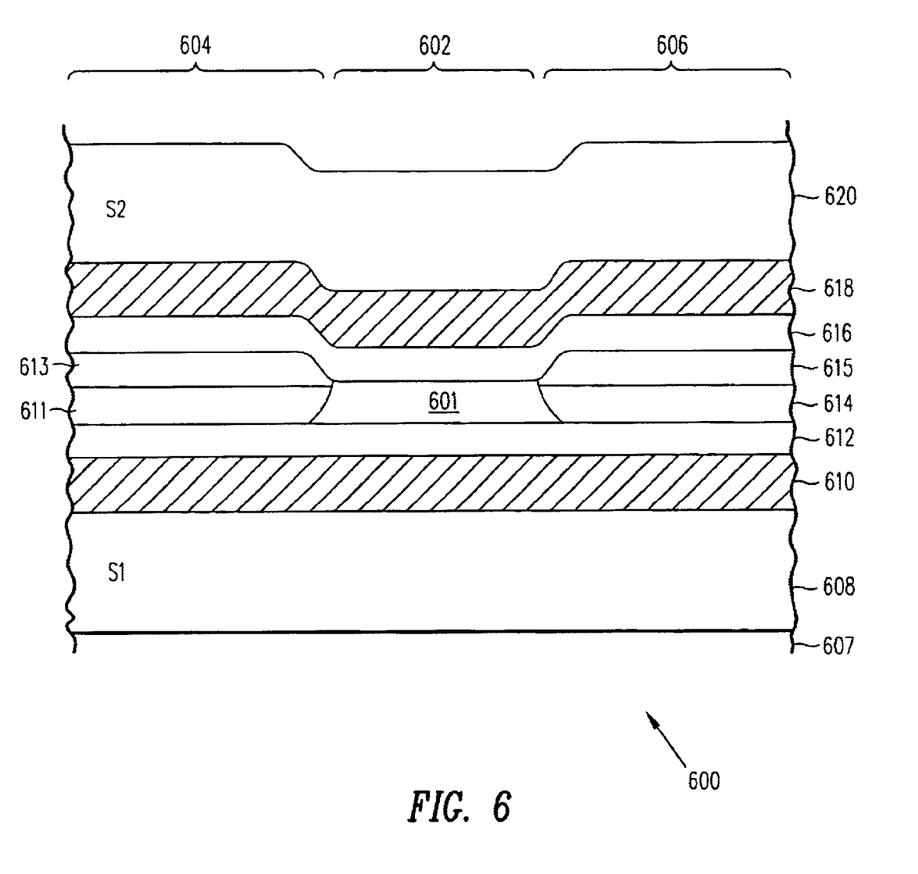
FIG. 6 is an air bearing surface view, not to scale, of the read head portion of a read/write head using the present invention.

FIG. 6 shows an airbearing surface (ABS) view of a read head 600 incorporating an SV sensor 601 having improved insulation according to a preferred embodiment of the present invention. The read head 600 comprises end regions 604 and 606 separated from each other by a central region 602. The active magnetoresistive layers of the SV sensor 601 are located in the central region 602. Longitudinal bias layers 611 and 614 and leads 613 and 615 for the SV sensor 601 are located in the end regions 604 and 606. The SV sensor 601 in the central region 602 and the bias layers 611 and 614 and leads 613 and 615 in the end regions 604 and 606 are sandwiched between nonmagnetic electrically insulative read gap layers 612 and 616, and the read gap layers are sandwiched between first and second shield cap layers 610 and 618 which, in turn, are sandwiched between ferromagnetic first and second shields 608 and 620.

The SV sensor 601 may be any one of the many SV sensors known to the art for use in high density magnetic recording applications including those known to the art as simple top and bottom SV sensors, anti-parallel (AP) pinned sensors and dual sensors. Alternatively, magnetic tunnel junction (MTJ) sensors may be used in place of the SV sensor 601 in applications where the shield layers are not used as the electrical leads for providing a sense current. In the present embodiment, the SV sensor 601 is preferably an ultrathin SV sensor suitable for use with the very small read gaps needed for high density recording applications.

The read head 600 may be fabricated in a magnetron sputtering or an ion beam sputtering system to sequentially deposit the multilayer structure shown in FIG. 6. The first shield 608 of Ni—Fe (permalloy) having a thickness in the range of 5000–10000 Å is deposited on a substrate 607. The first shield cap layer 610 of Fe—Hf—$O_x$ having a thickness in the range 10–1000 Å is deposited over the first shield, and first read gap layer 612 of $Al_2O_3$ having a thickness in the range of 5–300 Å is deposited over the first shield cap layer. Alternatively, the first read gap layer may be omitted. The multilayers comprising the SV sensor 601 are sequentially deposited over the first read gap layer 612 and are defined in the central region 602 by depositing a photoresist and using photolithography and ion milling processes well known in the art. The longitudinal bias layers 611 and 614 and the leads 613 and 615 are deposited over the first read gap layer 612 in the end regions 604 and 606. The second read gap layer 616 of $Al_2O_3$ having a thickness in the range 5–300 Å is deposited over the SV sensor 601 in the central region 602 and over the leads 613 and 615 in the end regions 604 and 606. Alternatively, the second read gap layer may be omitted. The second shield cap layer 618 of Fe—Hf—$O_x$ having a thickness in the range 10–1000 Å is deposited over the second read gap layer 616 and the second shield 620 of Ni—Fe having a thickness in the range 5000–10000 Å is deposited over the second shield cap layer 618.

The first and second shield cap layers 610 and 618 are made of soft ferromagnetic material having electrically insulative properties. The Fe—Hf—$O_x$ used to form shield cap layers 610 and 618 is a granular high resistivity material having a permeability $\mu$ in the range of 100–1000 and resistivity $\rho$ in the range of $10^4$–$10^7$ ohm-cm. Alternatively, shield cap layers 610 and 618 may be made of ferromagnetic Mn—Zn ferrite, an insulator having a permeability $\mu$ in the range 20–100 and resistivity $\rho$ in the range of $10^7$–$10^{10}$ ohm-cm.

Figure 7:
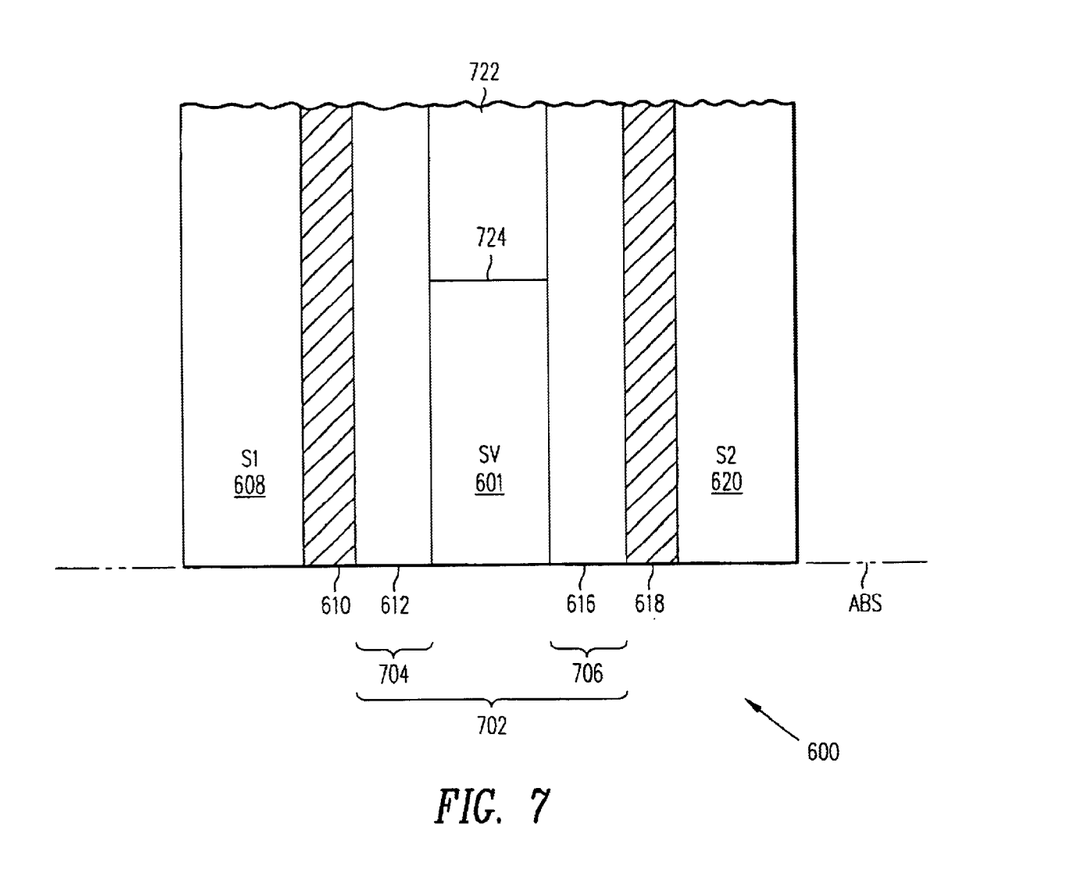
FIG. 7 is a vertical cross-section view, not to scale, of the read head portion of a read/write head using the present invention.

The use of shield cap layers 610 and 618 having soft magnetic properties and high electrical resistivity improves the read head 600 by increasing the electrical insulation of the SV sensor 601 from the metallic shields 608 and 620 without increasing the small magnetic read gap needed for high density recording applications. FIG. 7 shows a vertical cross-section of the read head 600 of the present invention. Because the first and second shield cap layers 610 and 618 are ferromagnetic, first and second magnetic read gaps 704 and 706 are defined by the thin first and second read gap layers 612 and 616, respectively, while the electrical insulation of the SV sensor 601 from the shields 608 and 620 is determined by adding the resistance of the first and second shield cap layers 610 and 618 to the resistance of the first and second read gap layers 612 and 616, respectively. The read gap 702 of the read head 600 can be significantly reduced by using very thin first and second read gap layers 612 and 616 while maintaining the required level of electrical isolation of the SV sensor 601 from the shields 608 and 620. Insulation layer 722 of $Al_2O_3$, sandwiched between first and second read gap layers 612 and 616, is deposited at a back edge 724 of the SV sensor 601 to provide insulation of the back edge.

Another advantage of the first and second shield cap layers 610 and 618 of the present invention is reduced smearing of the metallic shields 608 and 620 at the ABS resulting in electrical shorting to the SV sensor 601 due to keeping the shields at a greater distance from the SV sensor. The greater distance of the metallic shields from the SV sensor also results in decreased telegraph noise on the magnetoresistive read signal provided by the SV sensor.

While the present invention has been particularly shown and described with reference to the preferred embodiments, it will be understood by those skilled in the art that various changes in form and detail may be made without departing from the spirit, scope and teaching of the invention. Accordingly, the disclosed invention is to be considered merely as illustrative and limited in scope only as specified in the appended claims.

We claim:

1. A read head, comprising:
   first and second ferromagnetic shields;
   first and second read gap layers of nonmagnetic electrically insulative material;
   a first shield cap layer of ferromagnetic electrically insulative material sandwiched between said first ferromagnetic shield and said first read gap layer;
   a second shield cap layer of ferromagnetic electrically insulative material sandwiched between said second ferromagnetic shield and said second read gap layer; and,
   a magnetoresistive sensor sandwiched between said first and second read gap layers,
   wherein said first and second shield cap layers are made of manganese zirconium ferrite (Mn—Zr ferrite).

2. A magnetic read/write head, comprising:
   a write head, including:
      at least one coil layer and an insulation stack, the coil layer being embedded in the insulation stack;
      first and second pole piece layers connected at a back gap and having pole tips with edges forming a portion of an air bearing surface (ABS), the insulation stack being sandwiched between the first and second Pole piece layers; and a write gap layer sandwiched between the pole tips of the first and second pole piece layers and forming a portion of the ABS;

a read head, including:
   first and second ferromagnetic shields;
   first and second read gap layers of nonmagnetic electrically insulative material;
   a first shield cap layer of ferromagnetic electrically insulative material sandwiched between said first ferromagnetic shield and said first read gap layer;
   a second shield cap layer of ferromagnetic electrically insulative material sandwiched between said second ferromagnetic shield and said second read gap layer; and
   a magnetoresistive sensor sandwiched between said first and second read gap layers; and
   an insulation layer disposed between the second shield of the read head and the first pole niece layer of the write head,
   wherein said first and second shield cap layers are made of manganese zirconium ferrite (Mn—Zr ferrite).

3. A disk drive system, comprising:

a magnetic recording disk;

a magnetic read/write head for magnetically recording data on the magnetic recording disk and for sensing magnetically recorded data on the magnetic recording disk, said magnetic read/write head comprising:
   a write head, including:
      at least one coil layer and an insulation stack, the coil layer being embedded in the insulation stack;
      first and second pole piece layers connected at a back gap and having pole tips with edges forming a portion of an air bearing surface (ABS), the insulation stack being sandwiched between the first and second pole piece layers; and
      a write gap layer sandwiched between the pole tips of the first and second pole piece layers and forming a portion of the ABS;
   a read head, including:
      first and second ferromagnetic shields;
      first and second read gap layers of nonmagnetic electrically insulative material;
      a first shield cap layer of ferromagnetic electrically insulative material sandwiched between said first ferromagnetic shield and said first read gap layer;
      a second shield cap layer of ferromagnetic electrically insulative material sandwiched between said second ferromagnetic shield and said second read gap layer, wherein said first and second shield cap layers are made of manganese zirconium ferrite (Mn—Zr ferrite); and
      a magnetoresistive sensor sandwiched between said first and second read gap layers;
   an insulation layer disposed between the second shield of the read head and the first pole piece layer of the write head;
   an actuator for moving said magnetic read/write head across the magnetic disk so that the read/write head may access different regions of the magnetic recording disk; and
   a recording channel coupled electrically to the write head for magnetically recording data on the magnetic recording disk and to the magnetoresistive sensor of the read head for detecting changes in resistance of the magnetoresistive sensor in response to magnetic fields from the magnetically recorded data.

* * * * *

UNITED STATES PATENT AND TRADEMARK OFFICE
CERTIFICATE OF CORRECTION

PATENT NO. : 6,785,099 B2  Page 1 of 1
APPLICATION NO. : 10/068231
DATED : August 31, 2004
INVENTOR(S) : Wen-Yaung Lee et al.

It is certified that error appears in the above-identified patent and that said Letters Patent is hereby corrected as shown below:

In column 7, claim 2, line 27 change "niece" to --piece--

Signed and Sealed this

Twenty-fourth Day of June, 2008

JON W. DUDAS
*Director of the United States Patent and Trademark Office*